(12) United States Patent
Shazeer et al.

(10) Patent No.: US 10,521,701 B2
(45) Date of Patent: Dec. 31, 2019

(54) PARALLEL DECODING USING AUTOREGRESSIVE MACHINE LEARNING MODELS

(71) Applicant: Google LLC, Mountain View, CA (US)

(72) Inventors: Noam M. Shazeer, Palo Alto, CA (US); Jakob D. Uszkoreit, Portola Valley, CA (US); Mitchell Thomas Stern, Berkeley, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/417,190

(22) Filed: May 20, 2019

(65) Prior Publication Data

US 2019/0354812 A1    Nov. 21, 2019

Related U.S. Application Data

(60) Provisional application No. 62/673,796, filed on May 18, 2018.

(51) Int. Cl.
| | | |
|---|---|---|
| *G06F 15/18* | (2006.01) | |
| *G06K 9/62* | (2006.01) | |
| *G06N 20/00* | (2019.01) | |
| *G06N 7/00* | (2006.01) | |

(52) U.S. Cl.
CPC ......... *G06K 9/6264* (2013.01); *G06K 9/6215* (2013.01); *G06N 7/00* (2013.01); *G06N 20/00* (2019.01)

(58) Field of Classification Search
CPC .................................................... G06N 3/0445
USPC ..................................................... 706/15, 45
See application file for complete search history.

(56) References Cited

U.S. PATENT DOCUMENTS

2019/0034591 A1*    1/2019    Mossin ..................... G06N 3/08

OTHER PUBLICATIONS

Gu et al., "Non-Autoregressive Neural Machine Translation" arXiv, Mar. 2018, 13 pages.
Kaiser et al, "Fast Decoding in Sequence Models Using Discrete Latent Variables," arXiv, Apr. 2018, 10 pages.
Lee et al, "Deterministic Non-Autoregressive Neural Sequence Modeling by Iterative Refinement," arXiv, Apr. 2018, 11 pages.
Vaswani et al, "Attention Is All You Need," arXiv, Dec. 2017, 15 pages.

* cited by examiner

*Primary Examiner* — David R Vincent
(74) *Attorney, Agent, or Firm* — Fish & Richardson P.C.

(57) ABSTRACT

Methods, systems, and apparatus, including computer programs encoded on computer storage media, for performing parallel generation of output from an autoregressive sequence to sequence model. In one aspect, a blockwise parallel decoding method takes advantage of the fact that some architectures can score sequences in sublinear time. By generating predictions for multiple time steps at once then backing off to a longest prefix validated by the scoring model, the methods can substantially improve the speed of greedy decoding without compromising performance.

21 Claims, 5 Drawing Sheets

Prediction—110

Get the block predictions $\hat{y}_{j+i} = \text{argmax}_{y_{j+i}} \, p_i(y_{j+i} \mid \hat{y}_{\leq j}, x)$ for $i = 1, \ldots, k$. ◄— 112

Verification—120

Find the largest $\hat{k}$ such that:

$\hat{y}_{j+i} = \text{argmax}_{y_{j+i}} \, p_1(y_{j+i} \mid \hat{y}_{\leq j+i-1}, x)$ for all $1 \leq i \leq \hat{k}$ ◄— 122

Acceptance—130

Extend $\hat{y}$ with $\hat{y}_{j+1}, \ldots, \hat{y}_{j+\hat{k}}$, and set $j \leftarrow j + \hat{k}$.

Prediction
410

Verification
420

Acceptance
430

FIG. 4

PARALLEL DECODING USING AUTOREGRESSIVE MACHINE LEARNING MODELS

CROSS-REFERENCE TO RELATED APPLICATIONS

This application claims the benefit under 35 U.S.C. § 119(e) of the filing date of U.S. Provisional Application No. 62/673,796, for Parallel Decoding Using Autoregressive Machine Learning Models, which was filed on May 18, 2018, and which is incorporated here by reference.

BACKGROUND

Decoding and generating output from an autoregressive model is, by nature, sequential because the model has to be supplied with its own, previous predictions. This makes large autoregressive models potentially difficult to apply in production environments, and particularly in low-latency environments.

Three currently related approaches to overcoming this difficulty may be mentioned. Each of them share the problem that, while they are faster, they also deteriorate in quality significantly.

The first approach is predicting fertilities and noisy parallel decoding. This approach is described in Gu et al., Non-Autoregressive Neural Machine Translation, published as a conference paper at the Sixth International Conference on Learning Representations 2018, available at https://arxiv.org/pdf/1711.02281.pdf.

The second approach is iterative refinement of independent predictions. This approach is described in Lee et al., Deterministic Non-Autoregressive Neural Sequence Modeling by Iterative Refinement, Apr. 17, 2018, available at https://arxiv.org/pdf/1802.06901.pdf.

The third approach is predicting a sequence of discrete latents sequentially, and then predicting the final sequence in parallel. This approach is described in Kaiser et al., Fast Decoding in Sequence Models Using Discrete Latent Variables, Apr. 29, 2018, available at https://arxiv.org/pdf/1803.03382.pdf.

While several common architecture classes including recurrent, convolutional, and self-attention networks make different trade-offs between the amount of computation needed per layer and the length of the critical path at training time, inference for novel inputs still remains an inherently sequential process.

Neural autoregressive sequence-to-sequence models have become the de facto standard for a wide variety of tasks including machine translation, summarization, and speech synthesis. Different novel network architectures now allow for increased parallelization during training. A much better fit for today's massively parallel hardware accelerators, these architectures require significantly less time to train. Performance at generation time, however, still poses a significant challenge when deploying such models for many practical applications.

As a result, a growing body of work is concerned with different approaches to accelerating generation from autoregressive models. These include probability density distillation, subscaling, and decomposing the problem into the autoregressive generation of a short sequence of discrete latent variables followed by a parallel generation step conditioned on the discrete latents. Some of these techniques are at least somewhat application specific, such as the non-autoregressive Transformer for machine translation. While some techniques achieved speed-ups of multiple orders of magnitude for speech synthesis, to the best of our knowledge, the largest published wall-clock time improvement for non-batched decoding in machine translation was approximately 4×, at a significant loss in quality.

SUMMARY

This specification describes techniques that exploit the ability of some architectures, e.g., the Transformer architecture, to score and train with increased parallelization. The Transformer is described in Vaswani et al., Attention Is All You Need, 31st Conference on Neural Information Processing Systems (NIPS 2017), Long Beach, Calif., USA, available at https://papers.nips.cc/paper/7181-attention-is-all-you-need.pdf. This paper is incorporated here by reference.

This specification describes techniques that train an extension of the basic autoregressive model to make multiple predictions in parallel, before determining the longest prefix of these parallel predictions that an autoregressive "checker" model would have predicted.

In general, one innovative aspect of the subject matter described in this specification can be embodied in methods method for generating output from an autoregressive model $p_1$ that include the actions of obtaining k−1 auxiliary models $p_i$ for i=2, ..., k, the auxiliary models $p_i$ each configured to predict a single i-th output from the model $p_1$ for a given prefix input; and performing the following operations for a current input until a termination condition is met: (a) generating a respective independent prediction from each of the models $p_1$ through $p_k$ for the current input, each independent prediction being a prediction of a single token; (b) finding a largest n such that (i) a prediction from model $p_1$ of a next token for an input of the current input concatenated with the first through the (n−1)st tokens independently predicted by models $p_1$ through $p_{(n-1)}$ matches (ii) the independent prediction of the n-th token by model $p_n$; and (c) extending a generated output by appending the independent predictions from models $p_1$ through $p_n$, to the generated output. Other embodiments of this aspect include corresponding computer systems, apparatus, and computer programs recorded on one or more computer storage devices, each configured to perform the actions of the methods.

Systems, methods, and programs implementing these techniques can achieve an approximate iteration reduction of two times with no loss in quality over greedily decoding from an autoregressive model. Together with knowledge distillation, an increase in the speed-up to be five-fold can be achieved with a modest sacrifice in performance. Another advantage of these techniques is that, in contrast to the other previously mentioned techniques for improving generation speed, they can be implemented on top of existing models with minimal modifications.

The techniques can achieve iteration reductions of up to 2× over a baseline greedy decoder with no loss in quality. Relaxing the acceptance criterion and fine-tuning model parameters provides reductions of up to 7× in exchange for a slight decrease in performance. The inventors' fastest models achieve a 4× speedup in wall-clock time.

BRIEF DESCRIPTION OF THE DRAWINGS

Like reference numbers and designations in the various drawings indicate like elements.

DETAILED DESCRIPTION

In a sequence-to-sequence problem, one is given an input sequence $(x_1, \ldots, x_n)$ and the goal is to predict the corresponding output sequence $(y_1, \ldots, y_m)$. These sequences might be source and target sentences in the case of machine translation, or low-resolution and high-resolution images in the case of image super-resolution.

Suppose a system has learned an autoregressive scoring model $p(y|x)$ that decomposes according to the left-to-right factorization $$\log p(y|x) = \sum_{j=0}^{m-1} \log p(y_{j+1} | y_{\leq j}, x).$$

Given an input x, a system can use this model to predict an output ŷ by greedy decoding as follows. Starting with j=0, the system repeatedly extends the prediction with the highest-scoring token $$\hat{y}_{j+1} = \arg\max_{y_{j+1}} p(y_{j+i} | \hat{y}_{\leq j}, x)$$

and sets j←j+1 until a termination condition is met. For language generation problems, systems typically stop once a special end-of-sequence token has been generated. For image generation problems, systems simply decode for a fixed number of steps.

Standard greedy decoding takes m steps to produce an output of length m, even for models that can efficiently score sequences in faster than linear time. While brute-force enumeration of output extensions longer than one token is intractable when the size of the vocabulary is large, the inventors have found that one can circumvent this issue by training a set of auxiliary models to propose candidate extensions.

As a matter of notation, the base model is designated as $p_1 = p$. In addition to learning the base model, $p_1$, the system also learns a collection of k−1 auxiliary models $p_2, \ldots, p_k$ for which $p_i (y_{j+i}|y_{\leq j}, x)$ is the probability of the (j+i)th token being $y_{j+i}$. Suitable values for k can be found in the range 2-20, or more particularly 2-10, and more particularly 4-6.

Figure 1:
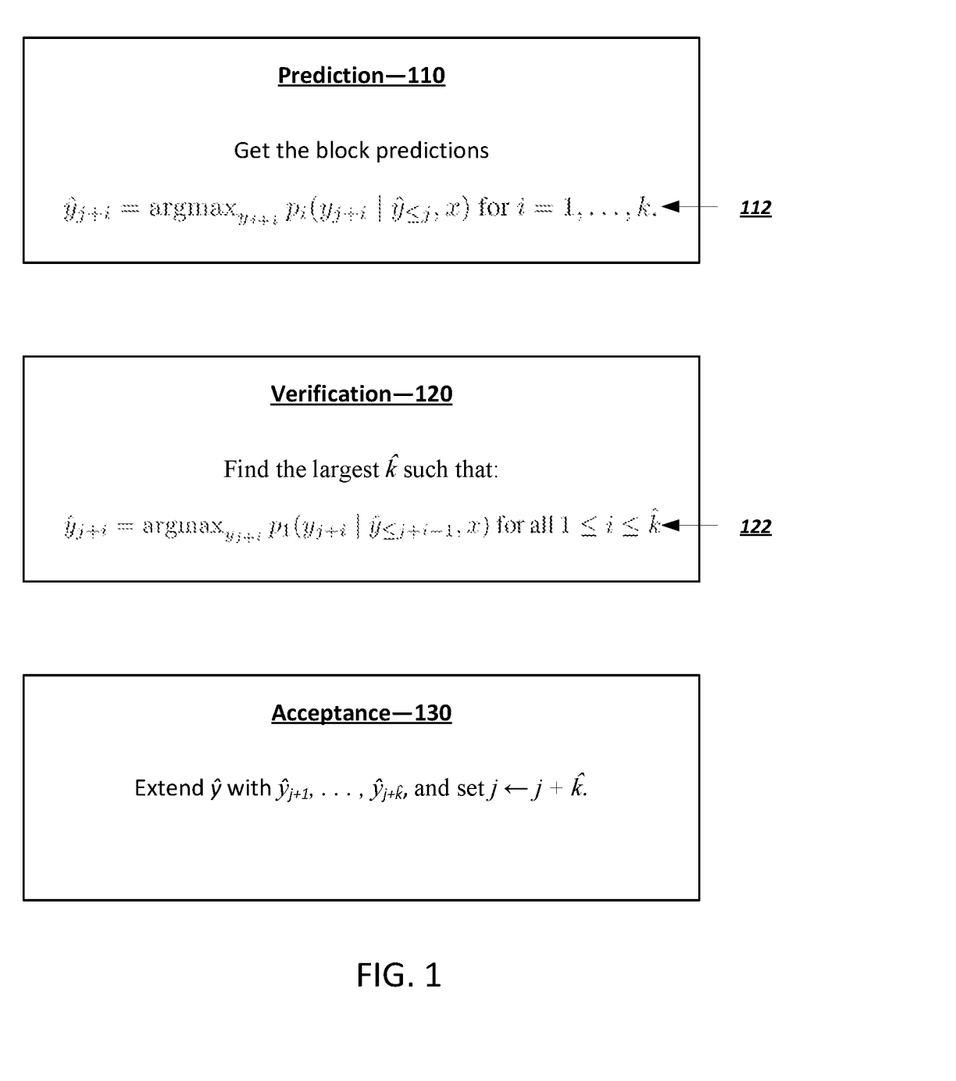
FIG. 1 is a block diagram showing three substeps of an example blockwise parallel decoding process.

FIG. 1 is a block diagram showing three substeps of an example blockwise parallel decoding process. The system performs the blockwise parallel decoding process, which is guaranteed to produce the same prediction 9 that would be found under greedy decoding, but uses as few as m/k steps. The system starts with an empty prediction, ŷ, and sets j=0. The three substeps of the example blockwise parallel decoding process are: prediction substep 110, verification substep 120, and acceptance substep 130. The system repeats the substeps 110, 120, and 130, until a termination condition is met:

(1) Predict (110):
Get the block predictions $$\hat{y}_{j+i} = \arg\max_{y_{j+i}} p_i(y_{j+i} | \hat{y}_{\leq j}, x) \text{ for } i=1, \ldots, k.$$

(2) Verify (120):
Find the largest k̂ such that $$\hat{y}_{j+i} = \arg\max_{y_{j+i}} p_1(y_{j+i} | \hat{y}_{\leq j+i-1}, x) \text{ for all } 1 \leq i \leq k$$

Note that k̂≥1 by the definition of $\hat{y}_{j+1}$.

(3) Accept (130):
Extend ŷ with $\hat{y}_{j+1}, \ldots, \hat{y}_{j+\hat{k}}$, and set j←j+k̂.

In the prediction substep 110, the system finds the local greedy predictions of the base model $p_1$ and the auxiliary models $p_2, \ldots, p_k$. The system finds the predictions according to equation 112. Since these are disjoint models, the system can compute each prediction in parallel, so little time is lost compared to a single greedy prediction.

In the verification substep 120, the system finds the largest prefix of the proposed length-k extension that would have otherwise been produced by $p_1$. If the scoring model can process this sequence of k tokens in fewer than k steps, this substep helps save time overall provided more than one token is correct. Stated another way, in the verification substep 120, the system finds the largest k such that equation 122 is true.

Lastly, in the acceptance substep 130, the system extends the hypothesis with the verified prefix. That is, the system extends ŷ with $\hat{y}_{j+1}, \ldots, \hat{y}_{j+\hat{k}}$, and sets j←j+k̂. By only using the tokens up to the point where the base model $p_1$ and the auxiliary models $p_2, \ldots, p_k$ disagree, the system will recover the same output that would have been produced by running greedy decoding with $p_1$.

The ability of these techniques to improve decoding performance hinges crucially on the ability of some network architectures to execute all predictions made in the verification substep 120 in parallel. In the Transformer, for example, while the total number of operations performed during decoding is quadratic in the number of predictions, the number of necessarily sequential operations is constant, regardless of the number of predicted output positions. This allows a system to execute the verification substep 120 for a number of positions in parallel without spending additional wall-clock time.

When using a Transformer for scoring, the techniques described above require two model invocations per step: one parallel invocation of $p_1, \ldots, p_k$ in the prediction substep, and an invocation of $p_1$ in the verification substep. This means that even with perfect auxiliary models, the techniques will only reduce the number of model invocations from m to 2m/k instead of the desired m/k.

Another technique can further reduce the number of model invocations from 2m/k to m/(k+1) by using a combined scoring and proposal scheme, in which case the nth verification substep can be merged with the (n+1)st prediction substep.

More specifically, consider a system implementing a single Transformer model which during the verification substep yields $p_i(y_{j+i'+i}|\hat{y}_{\leq j+i}, x)$ for all i=1, \ldots, k and i'=1, \ldots, k in a constant number of operations. This can be implemented for instance by increasing the dimensionality of the final projection layer of the Transformer by a factor of k and computing k separate softmaxes. Invoking the model after plugging in the k predicted outputs gives the required outputs. Then after k̂ has been computed during verification, the system will have already computed $p_i(y_{j+\hat{k}+i}|y_{\leq j+\hat{k}}, x)$ for all i, which is exactly what is required for the prediction substep in the next iteration of decoding. Hence these substeps can be merged together, reducing the number of model invocations by a factor of two for all but the very first iteration.

The techniques for block parallel decoding described so far produce the same output as a standard greedy decode. A system that relaxes the criterion used during verification, can realize additional speedups at the cost of potentially deviating from the greedy output.

In some implementations, a prediction matches an output of $p_1$ only if it is one of a predetermined number of closest predictions to that output of $p_1$. In other implementations, rather than requiring that a prediction exactly match the scoring model's prediction, the system can instead require only that it lie within the top k items. To accomplish this, the verification criterion can be replaced with $$\hat{y}_{j+i} \in \text{top-}k_{y_{j+i}} p_1(y_{j+i} | \hat{y} \leq_{j+i-1}, x).$$

In some other implementations, a prediction matches an output of $p_1$ only if the two are within a predetermined distance from each other. For example, in problems where the output space admits a natural distance metric d, the system implementation can replace the exact match against the highest-scoring element with an approximate match:

$$d\left(\hat{y}_{j+i}, \underset{y_{j+i}}{\operatorname{argmax}} p_1(y_{j+i} | \hat{y} \leq_{j+i-1}, x)\right) \leq \epsilon.$$

In the case of image generation, for example, a suitable distance metric $d(u, v)=|u-v|$ is the absolute difference between intensities u and v within a given color channel.

It is possible that the first non-greedy prediction within a given step is incorrect, in which case only a single token would be added to the hypothesis. To ensure a minimum speedup, the system could be implemented require that at least a minimum number of tokens be added during each decoding step. Setting this minimum number to k would correspond to parallel decoding with blocks of fixed size k.

Figure 2A:
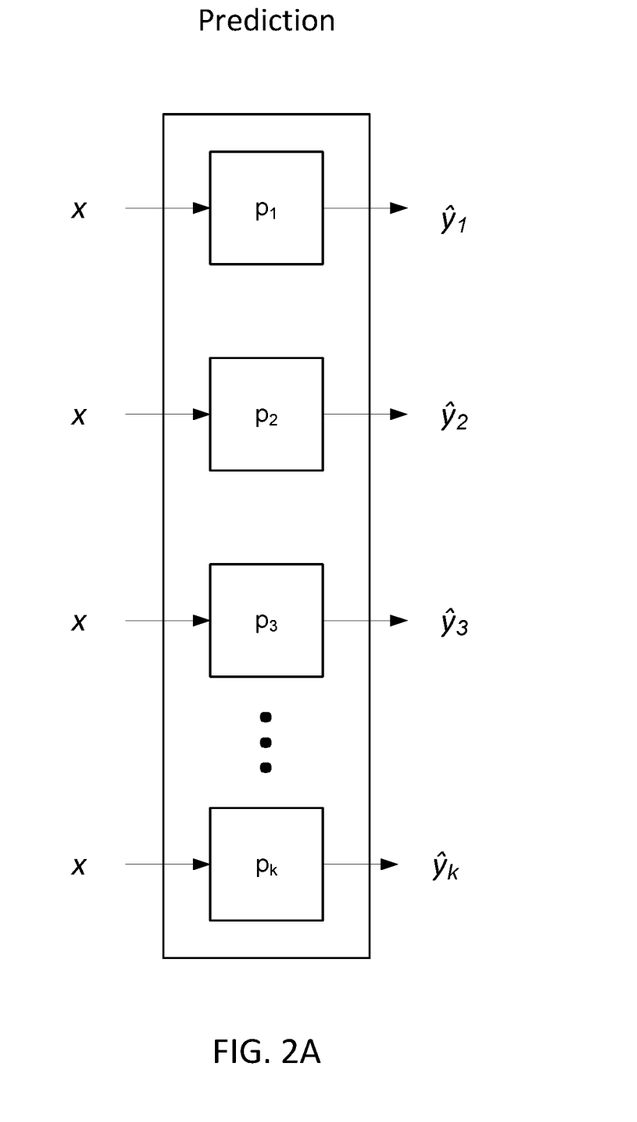
FIG. 2A illustrates operation of an example system performing a predict substep of blockwise parallel decoding.

FIG. 2A illustrates operation of an example system performing a prediction substep of blockwise parallel decoding. In this step, the base model $p_1$ receives an input x and predicts a single output token $\hat{y}_1$. The output $\hat{y}_1$ can be a local greedy prediction. The input x can be of one or more characters, one or more words, one or more sentences including one or more characters, or one or more images. Similarly, each auxiliary model $p_2, \ldots, p_k$ receives the input x and predicts a single output token $\hat{y}_i$ for $i=2, \ldots, k$. Each model predicts an output independently from and in parallel to every other model.

Figure 2B:
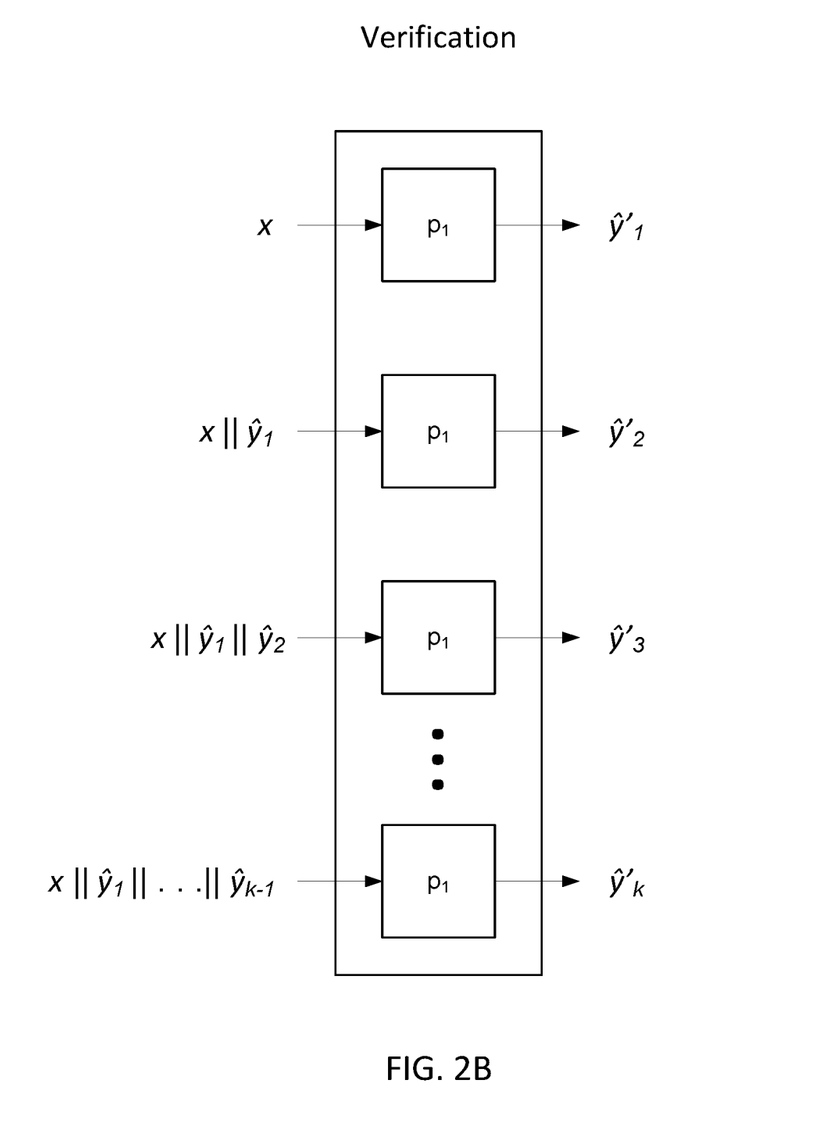
FIG. 2B illustrates operation of an example system performing a verification substep of blockwise parallel decoding.

FIG. 2B illustrates operation of an example system performing a verification substep of blockwise parallel decoding. In this step, the base model $p_1$ is used as a scoring model to determine which of the tokens $\hat{y}_i$, for $i=2, \ldots, k$, should be accepted. An n-th computational instance of $p_1$ receives as input $x \| \hat{y}_1 \| \ldots \| \hat{y}_{n-1}$, where "$\|$" denotes concatenation and $n=2, \ldots, k$, and outputs a scoring prediction token $\hat{y}'_n$. These computations can be done in parallel. In this verify step, a largest n is found for which $\hat{y}_i$ matches $\hat{y}'_i$ for all i that are less than or equal to n.

Figure 3:
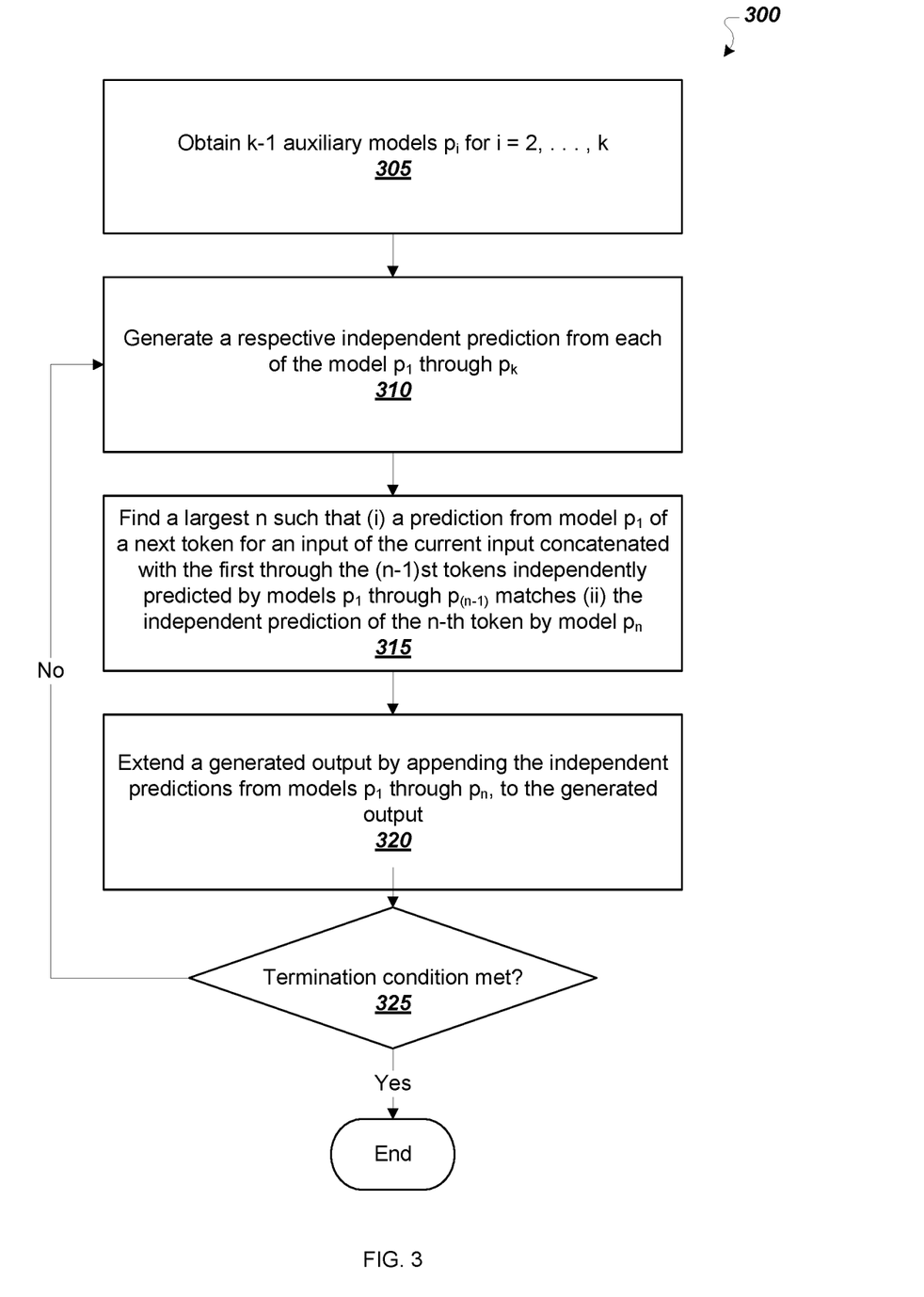
FIG. 3 is a flowchart of an example blockwise parallel decoding process.

FIG. 3 is a flowchart of an example blockwise parallel decoding process 300. The example process will be described as being performed by a system programmed appropriately in accordance with this specification.

The system obtains (k-1) auxiliary models, $p_i$, for $i=2, \ldots, k$ (305). Each auxiliary model $p_i$ is configured to predict a single i-th output from a common prefix input, also referred to as the current input.

The system generates a respective independent prediction from each of the models $p_1$ through $p_k$ for the current input (310). Each independent prediction is a prediction of a single token.

The system finds a largest n such that (i) a prediction from model $p_1$ of a next token for an input of the current input concatenated with the first through the (n−1)st tokens independently predicted by models $p_1$ through $p_{n-1}$ matches (ii) the independent prediction of the n-th token by model $p_n$ (315). For example, using the notation of FIG. 2B, the system finds the largest n such that $\hat{y}_n$ matches $\hat{y}'_n$ for all predictions up to the n-th.

In some implementations, respective predictions match only if the two are identical; in other implementations, predictions match only if the two are within a predetermined distance from each other; while in yet other implementations, a prediction matches an output of $p_1$ only if it is one of a predetermined number of closest predictions to that output of $p_1$, as described in greater detail above.

The system extends a previously generated output of model $p_1$, referred to as x above, by appending the independent predictions from models $p_1$ through $p_n$, for the largest n described above, to the previously generated output (320). The system extends the previously generated output with the verified prediction, $\hat{y}_1 \| \ldots \| \hat{y}_n$, found when the system found the largest n (315).

The system determines whether a termination condition has been met (325). If a termination condition has been met, the process ends. If a termination condition has not been met, the process iterates and the system generates additional predictions (310), finds a largest n, based on the additional predictions (315), and extends the generated output of model $p_1$, based on the largest n (320) until the termination condition is met.

Figure 4:
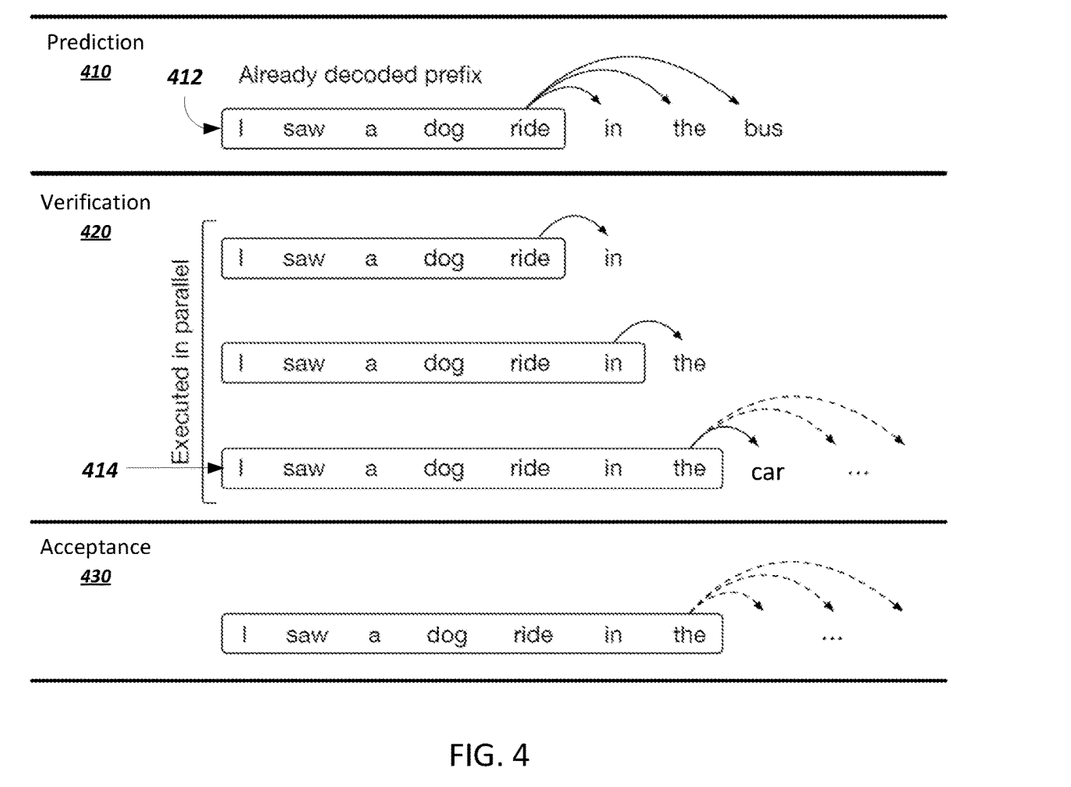
FIG. 4 shows the example blockwise parallel decoding process of FIG. 3 being executed on an example prefix.

FIG. 4 shows the example blockwise parallel decoding process of FIG. 3 being executed on an example prefix 412, which corresponds to the x used above. The example prefix 412 is the words "I saw a dog ride". The process begins with an empty prediction ŷ.

In the prediction substep 410, the base model $p_1$ and the auxiliary models, e.g., models $p_2$, $p_3$, and so on, each make a single prediction of one output token. The models $p_1$, $p_2$, and $p_3$ predict the words "in", "the", and "bus", respectively. The three words occupy a first, second, and third position, respectively. Each prediction is made independently from and in parallel to every other prediction.

In the verification substep 420, the base model $p_1$ scores each of the independent predictions, conditioning on the previous independent predictions where applicable. In the example of FIG. 4, the highest probability prediction, or scoring prediction, for the third position is "car". The scoring prediction "car" is predicted by $p_1$ using an input 414, i.e., the words "I saw a dog ride in the". The input 414 is the words of prefix 412 concatenated with the independently predicted "in" and "the", which were predicted by the models $p_1$ and $p_2$ during the prediction substep 410. The scoring prediction "car" is different from the prediction by $p_3$ of "bus" for the third position.

In the acceptance substep 430, the system extends the prefix, ŷ, to include the predictions for the first and second positions, i.e., "in" and "the", but not the prediction for the third position, i.e., "bus". The prefix, ŷ, is extended before the models make the next k independent predictions.

FIG. 4 shows, in dotted arrows, which parallel predictions from the verification substep 420 would be re-used in the prediction substep in the next iteration of decoding. Note that the predictions will have to be computed for every position in the verification substep (albeit in parallel).

The parallel processes described in this specification have a number of technical advantages. The processes can be guaranteed not to degrade in quality. Despite this, the speed-up that has be obtained in practice in the inventors' experiments is similar to the speed-ups obtained by prior methods that do degrade in quality. In addition, the processes are very simple to implement. Compared to the other techniques mentioned above, the parallel process technique is trivial to implement and very robust in training.

Another metric of interest is actual wall-clock speedup relative to greedy decoding, which takes into account the additional overhead required for blockwise parallel prediction. In one set of experiments, the inventors found that wall-clock speedup peaked at 4.0 for the setting with k=6, which has a mean accepted block size of 5.3. Larger accepted block sizes continued to improve in terms of iteration count, but start to decline in terms of wall-clock improvement due to their higher computational cost.

The techniques of parallel processing can be used to improve the performance of autoregressive sequence to sequence models wherever such models are used to generate outputs. Examples of applications of autoregressive models include machine translation of one natural language to another, summarization of natural language text, in which the outputs are sequences of words in sentences, speech to text, and text to speech, involving sequences of words and phonemes. Other example applications include image generation, language modeling, and parsing, e.g., constituency parsing. Other examples include applications based on sequences of images, including applications in self-driving cars and robotics control. For example, from a sequence of inputs, e.g., images, of or from a physical system, real or virtual, that includes such model, can output a sequence of actions for controlling a machine operating in or with the physical system.

The techniques can be implemented advantageously in computer systems with GPUs because the process involve many parallel computations, resulting in particularly fast computations in wall clock time.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes described do not necessarily require the particular order shown, or sequential order, to achieve desirable results.

What is claimed is:

1. A method for generating output from an autoregressive model $p_1$, comprising:
   obtaining k−1 auxiliary models $p_i$ for i=2, ..., k, the auxiliary models $p_i$ each configured to predict a single i-th output from the model $p_1$ for a given prefix input; and
   performing the following operations for a current input until a termination condition is met:
      generating a respective independent prediction from each of the models $p_1$ through $p_k$ for the current input, each independent prediction being a prediction of a single token;
      finding a largest n such that (i) a prediction from model $p_1$ of a next token for an input of the current input concatenated with the first through the (n−1)st tokens independently predicted by models $p_1$ through $p_{(n-1)}$ matches (ii) the independent prediction of the n-th token by model $p_n$; and
      extending a generated output by appending the independent predictions from models $p_1$ through $p_n$, to the generated output.

2. The method of claim 1, wherein a respective prediction matches an output of $p_1$ only if the two are identical.

3. The method of claim 1, wherein a respective prediction matches an output of $p_1$ only if it is one of a predetermined number of closest predictions to that output of $p_1$.

4. The method of claim 1, wherein a respective prediction matches an output of $p_1$ only if the two are within a predetermined distance from each other.

5. The method of claim 1, wherein k is an integer in a range of 2-20, or 2-10, or 4-6.

6. The method of claim 1, wherein the autoregressive model is a deep neural autoregressive model.

7. The method of claim 1, wherein the one-token predictions from each of the models $p_1$ through $p_k$ are generated in parallel.

8. A system implemented by one or more computers, the system comprising:
   an autoregressive model $p_1$; and
   k−1 auxiliary models $p_i$ for i=2, ..., k, the auxiliary model $p_i$ each configured to predict a single i-th output from the model $p_1$ for a given prefix input;
   wherein the system is configured to perform the following operations for a current input until a termination condition is met:
      generating independent predictions from each of the models $p_1$ through $p_k$ for the current input, each independent prediction being a prediction of a single token;
      finding a largest n such that (i) a prediction from model $p_1$ of a next token for an input of the current input concatenated with the first through the (n−1)st tokens independently predicted by models $p_1$ through $p_{(n-1)}$ matches (ii) the independent prediction of the n-th token by model $p_n$; and
      extending a generated output by appending the independent predictions from models $p_1$ through $p_n$, to the generated output.

9. The system of claim 8, wherein a respective prediction matches an output of p1 only if the two are identical.

10. The system of claim 8, wherein a respective prediction matches an output of p1 only if it is one of a predetermined number of closest predictions to that output of p1.

11. The system of claim 8, wherein a respective prediction matches an output of p1 only if the two are within a predetermined distance from each other.

12. The system of claim 8, wherein k is an integer in a range of 2-20, or 2-10, or 4-6.

13. The system of claim 8, wherein the autoregressive model is a deep neural autoregressive model.

14. The system of claim 8, wherein the one-token predictions from each of the models $p_1$ through $p_k$ are generated in parallel.

15. One or more computer-readable storage media encoded with instructions that, when executed by one or more computers, cause the one or more computers to perform operations comprising:

obtaining an autoregressive model $p_1$ and k−1 auxiliary models $p_i$ for i=2, . . . , k, the auxiliary models $p_i$ each configured to predict a single i-th output from the model $p_1$ for a given prefix input; and performing the following operations for a current input until a termination condition is met:

generating a respective independent prediction from each of the models $p_1$ through $p_k$ for the current input, each independent prediction being a prediction of a single token;

finding a largest n such that (i) a prediction from model $p_1$ of a next token for an input of the current input concatenated with the first through the (n−1)st tokens independently predicted by models $p_1$ through $p_{(n-1)}$ matches (ii) the independent prediction of the n-th token by model $p_n$; and extending a generated output by appending the independent predictions from models $p_1$ through $p_n$, to the generated output.

16. The one or more computer-readable storage media of claim 15, wherein a respective prediction matches an output of $p_1$ only if the two are identical.

17. The one or more computer-readable storage media of claim 15, wherein a respective prediction matches an output of $p_1$ only if it is one of a predetermined number of closest predictions to that output of $p_1$.

18. The one or more computer-readable storage media of claim 15, wherein a respective prediction matches an output of $p_1$ only if the two are within a predetermined distance from each other.

19. The one or more computer-readable storage media of claim 15, wherein k is an integer in a range of 2-20, or 2-10, or 4-6.

20. The one or more computer-readable storage media of claim 15, wherein the autoregressive model is a deep neural autoregressive model.

21. The one or more computer-readable storage media of claim 15, wherein the one-token predictions from each of the models $p_1$ through $p_k$ are generated in parallel.

* * * * *